United States Patent Office 3,072,668
Patented Jan. 8, 1963

3,072,668
1,4-BIS(TETRAMETHYL-4-HYDROXY-
4-PIPERIDYL)BUTADIYNE
Robert I. Meltzer, Rockaway, and Wilson B. Lutz, Florham Park, N.J., assignors to Warner-Lambert Pharmaceutical Company, Morris Plains, N.J., a corporation of Delaware
No Drawing. Filed Sept. 25, 1961, Ser. No. 140,213
1 Claim. (Cl. 260—294.7)

The present invention relates to new and novel piperidine derivatives having the formula

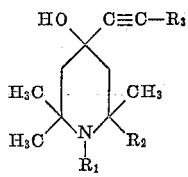

wherein $R_1$ is hydrogen or lower alkyl, $R_2$ is hydrogen or methyl and $R_3$ is hydrogen, lower alkyl or a radical of the formula

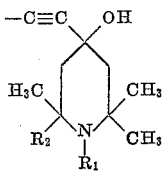

and to the pharmaceutically acceptable non-toxic acid addition and quaternary ammonium salts thereof.

The compounds of our invention having the above formula have been found to possess significant pharmacological activity in lowering blood pressure. Moreover, they are valuable intermediates in the production of other piperidine derivatives.

We have now found that the compounds of our invention having the formula

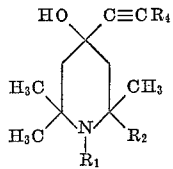

wherein $R_1$ and $R_2$ are as described hereinabove and $R_4$ is hydrogen or lower alkyl may be prepared by the reaction of a substituted 4-piperidone starting material of the formula

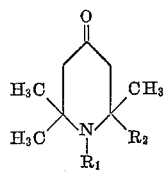

with an alkyne of the formula $CH \equiv CR_4$ in the presence of liquid ammonia and an alkali metal such as sodium. After the evaporation of the ammonia at the conclusion of the reaction, the product is recovered and purified by crystallization.

We have also found that those compounds of our invention having the formula

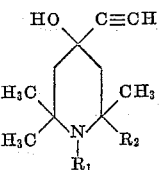

may be converted to compounds of the formula

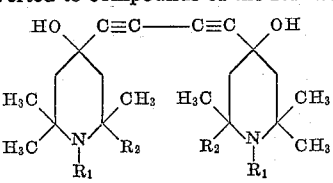

by an oxidative coupling procedure utilizing aqueous cuprous chloride and ammonium chloride in the presence of oxygen. The pH of the reaction mixture is maintained slightly on the acid side and oxygen gas is bubbled through the mixture. At the conclusion of the reaction, basification of the mixture with ammonium hydroxide results in precipitation of the desired product.

The compounds of our invention may be readily converted by conventional procedures into their pharmaceutically acceptable non-toxic acid addition and quaternary ammonium salts. Useful acid addition salts are those of such acids as maleic, oxalic, citric, acetic, methylsulfonic, p-toluenesulfonic, sulfonic, sulfuric, phosphoric, cinnamic, hydrochloric, hydrobromic and the like. Useful quaternaries are formed with such reactive halides or esters as methyl iodide, n-hexyl bromide, benzyl chloride, methyl sulfate, ethyl sulfate, methyl p-toluenesulfonate and the like.

For therapeutic use, our new and novel compounds, either as the free base or in the form of a salt, may be formulated with a conventional pharmaceutical carrier to form tablets, capsules, elixirs, solutions, suspensions, suppositories and the like.

The following examples are included in order further to illustrate our invention:

EXAMPLE 1

*4-Ethynyl-2,2,6,6-Tetramethyl-4-Piperidinol*

In a 2-liter three-necked flask fitted with a stirrer, Dry Ice condenser protected by a tube filled with sodium hydroxide, and a gas inlet tube, are condensed about 800 ml. of liquid ammonia distilled from sodium. Sodium metal (13.8 g., 0.06 mole) is then added in small pieces and a current of acetylene passed in until the blue color is discharged and for an additional hour thereafter. Crude anhydrous 2,2,6,6-tetramethyl-4-piperidone (35.5 g., 0.225 mole) is then added and the stream of acetylene continues for an additional 5½ hours. The ammonia is then permitted to evaporate, a warm water bath being used near the end. A current of dry nitrogen is then passed through the vessel. The walls of the flask are rinsed with ethanol followed by the addition of 100 ml. of water. The suspended solid is then filtered and washed. The crude wet solid is dissolved in dilute acetic acid, treated with decolorizing charcoal and precipitated with dilute potassium hydroxide. The solid is washed and dried, yielding 21.6 g. (54%) of product as a white powder, M.P. 213–214°. Sublimation at 0.15 mm. of mercury yields product with a melting point of 214–215.6°.

ANALYSIS

|  | C | H | N |
|---|---|---|---|
| Calc | 72.88 | 10.56 | 7.73 |
| Found | 72.76 | 10.51 | 7.80 |

EXAMPLE 2

*1,4-Bis(2,2,6,6-Tetramethyl-4-Hydroxy-4-Piperidyl) Butadiyne*

In a 500 ml. three-necked flask fitted with a mechanical stirrer are placed 20.15 g. (0.112 mole) of 4-ethynyl-2,2,6,6-tetramethyl-4-piperidinol, 45 g. of ammonium chloride, 28 g. of cuprous chloride, 22.5 ml. of 6 N hydrochloric acid, 112 ml. of water and sufficient ammonium hydroxide to bring the pH to about 5.5. Oxygen is bubbled through the stirred suspension of solids by means of a sintered glass tube for 1½ hours. The mixture is made strongly basic with ammonium hydroxide and the product filtered. The crude material weighs 18.3 g. (92%), M.P. 226–230°.

An analytical sample is prepared by dissolving the crude product in aqueous acetic acid decolorizing with charcoal, and precipitating with ammonia to yield material with a melting point of 231–232°.

ANALYSIS

|  | C | H | N |
|---|---|---|---|
| Calc | 73.29 | 10.07 | 7.77 |
| Found | 73.17 | 10.33 | 7.75 |

In the foregoing examples, all temperatures are given in degrees centigrade.

It is understood that the foregoing detailed description is given merely by way of illustration and that many variations may be made therein without departing from the spirit of our invention.

Having described our invention what we desire to secure by Letters Patent is:

1,4-bis(2,2,6,6-tetramethyl-4-hydroxy-4-piperidyl) butadiyne.

References Cited in the file of this patent

FOREIGN PATENTS 564,780     Belgium _____ Aug. 30, 1958